US007480536B2

(12) United States Patent
Kaufman et al.

(10) Patent No.: US 7,480,536 B2

(45) Date of Patent: Jan. 20, 2009

(54) METHOD FOR ASSESSING RELIABILITY REQUIREMENTS OF A SAFETY INSTRUMENTED CONTROL FUNCTION

(75) Inventors: Eric S. Kaufman, Simpsonville, SC (US); Robert Brooks, Greer, SC (US); Bret Dalton, Greer, SC (US); Kenneth L. Leary, Anderson, SC (US)

(73) Assignee: General Electric Company, Schenectady, NY (US)

(*) Notice: Subject to any disclaimer, the term of this patent is extended or adjusted under 35 U.S.C. 154(b) by 273 days.

(21) Appl. No.: 11/524,679

(22) Filed: Sep. 21, 2006

(65) Prior Publication Data

US 2008/0126150 A1 May 29, 2008

(51) Int. Cl.

| | |
|---|---|
| ***G05B 9/02*** | (2006.01) |
| ***G05D 23/00*** | (2006.01) |
| *G06F 15/00* | (2006.01) |
| *G06F 11/30* | (2006.01) |
| *B60Q 1/00* | (2006.01) |
| *G08B 1/00* | (2006.01) |

(52) U.S. Cl. ......................... 700/79; 340/439; 340/532; 700/276; 700/277; 702/179; 702/182; 702/183; 702/185

(58) Field of Classification Search ................. 702/179, 702/182, 183, 185; 700/79, 276, 277; 340/532, 340/439

See application file for complete search history.

(56) References Cited

U.S. PATENT DOCUMENTS

| | | | | |
|---|---|---|---|---|
| 4,520,482 | A * | 5/1985 | Fourre et al. | 714/47 |
| 4,632,802 | A * | 12/1986 | Herbst et al. | 376/216 |
| 5,513,107 | A | 4/1996 | Gormley | |
| 5,581,464 | A | 12/1996 | Woll et al. | |
| 5,666,010 | A * | 9/1997 | Stratiotis | 307/328 |
| 5,687,093 | A | 11/1997 | Long et al. | |
| 5,699,402 | A | 12/1997 | Bauer et al. | |
| 5,715,178 | A | 2/1998 | Scarola et al. | |
| 5,919,046 | A | 7/1999 | Hull | |
| 6,218,951 | B1 | 4/2001 | Colvin | |
| 6,223,091 | B1 | 4/2001 | Powell | |
| 6,389,331 | B1 | 5/2002 | Jensen et al. | |
| 6,415,276 | B1 | 7/2002 | Heger et al. | |
| 6,442,511 | B1 | 8/2002 | Sarangapani et al. | |
| 6,473,660 | B1 | 10/2002 | Thibault | |
| 6,625,589 | B1 * | 9/2003 | Varma et al. | 706/45 |
| 6,741,951 | B2 * | 5/2004 | Whaling et al. | 702/179 |
| 6,915,173 | B2 * | 7/2005 | Chan et al. | 700/44 |
| 7,096,158 | B2 * | 8/2006 | Kitada et al. | 702/185 |

(Continued)

*Primary Examiner*—Albert DeCady
*Assistant Examiner*—Thomas H Stevens
(74) *Attorney, Agent, or Firm*—Ernest G. Cusick; Frank A. Landgraff

(57) ABSTRACT

A method for analyzing a system for safety to personnel is disclosed comprising: identifying at least one operating parameter of a first subcomponent of said product; identifying an inherent hazard of said first subcomponents based on an analysis of the at least one operating parameter; identifying features of the structure or operation of the subcomponent corresponding to the inherent hazard; identifying design modifications for the identified features that would mitigate the inherent hazard; identifying safety instrumented control functions and their probability of failure requirements that would mitigate the inherent hazard; prioritizing the identified features with respect to the effect that each of said features has on safety of the product; and determining whether an unsafe condition could result from the inherent hazard.

5 Claims, 15 Drawing Sheets

U.S. PATENT DOCUMENTS 7,103,422 B2 * 9/2006 Takeuchi et al. .............. 700/21
7,254,514 B2 * 8/2007 House et al. ................ 702/181
7,269,465 B2 * 9/2007 Esch et al. .................... 700/21
2002/0103630 A1 8/2002 Aldred et al.
2003/0004965 A1 1/2003 Farmer et al.
2003/0058103 A1 3/2003 Jansson
2003/0146823 A1 8/2003 Jansson
2003/0171897 A1 9/2003 Bieda et al.
2003/0182180 A1 9/2003 Zarrow
2004/0181296 A1 * 9/2004 Muneta et al. ................ 700/21
2005/0149289 A1 * 7/2005 Whaling et al. ............. 702/181

* cited by examiner

METHOD FOR ASSESSING RELIABILITY REQUIREMENTS OF A SAFETY INSTRUMENTED CONTROL FUNCTION

This application is related to U.S. Pat. No. 6,741,951, issued May 25, 2004, and assigned to the instant Assignee of this application.

BACKGROUND OF THE INVENTION

This invention relates to safety analysis of a product or system. More particularly, it relates to a method for conducting an analysis of a product or a system to evaluate hazards to personnel and identify mitigating conditions that include safety instrumented systems that are needed to control or avoid such hazards. It is important that minimum reliability requirements be established for these safety instrumented control functions.

A variety of different processes have been used in the past to determine safety of various systems. These processes are often introduced after the occurrence of a catastrophic event or after the occurrence of a consistent series of events resulting in harm to personnel. The application of safety instrumented control systems requires a hazard and risk analysis to be conducted to derive the need for a safety instrumented control function with suitable safety integrity to reduce the likelihood of an unsafe event occurring.

Preliminary hazard assessment (PHA) had origins from a combination of industry hazard checklists that are generally standard checklists. These checklists required identification of inherent hazards, which a test applicant must address specifically in a subsequent review session. One of the shortcomings of this process involves the task of addressing the risk that was left to an applicant, however, in any style deemed appropriate to the applicant's knowledge. Thus, the documentation of the approach and the results greatly varied, and required additional time and resources to ensure completeness. Also, gathering information with respect to critical hazardous features and combinations depended on an initial reviewer's expertise. Moreover, gathering information with respect to critical hazardous features and combinations can often present conflicting results that vary greatly.

Hazard characterization and personal safety analysis involve examination of hazards associated with a job or a task. In this technique, workers are grouped so that risks and exposures experienced by any member of a group are representative of the group as a whole. Information about the nature of a workplace, equipment and materials used, and the tasks to be performed may be considered as the basis of this step.

In another approach, a preliminary assessment of hazards requires a minimal effort to identify the inventory of hazardous materials to perform an initial hazard categorization. Reviewing basic facility information on intended facility operations and using estimates of materials may lead to an acceptable assessment. Hazard characterization also uses information from existing hazard analysis documentation such as, for example, safety analysis reports, process hazard analysis, job safety analysis (JSA), and the job hazard analysis.

Hazards are identified and resultant risks are assessed by considering probability of occurrence and severity of consequence. System safety is part of the overall program risk management decision process. Severity is an assessment of the worst credible potential consequence, defined by degree of injury or property damage that could occur. For example, but not limited to, hazard severity may be categorized as: catastrophic, critical, marginal and negligible.

Factors for identification of hazards include, but are not limited to, for example, (a) identification of hazardous components, (b) identification of hazardous operating conditions, (c) safety related interface considerations, (d) environmental constraints including operating environments, (e) training and certification pertaining to hazardous and safety critical operations and maintenance of hazardous and safety critical systems, etc.

Hazardous operations review analysis is performed to evaluate activities for hazards or risks introduced into a system by operational and support procedures and also to evaluate the adequacy of operational and support procedures that are used to eliminate or control identified hazards or risks. Typically, hazards are identified and evaluated by considering such criteria as plan system configuration and state at each phase of an activity; facility interfaces; supporting tools including software controlled automatic test equipment, to name but a few. Human factor(s) may be considered as an element of the total system, receiving both inputs and initiating outputs during the conduct of the analysis.

Safety efforts related to the hazardous operations review process focus primarily on the safe operation of a system. This process focuses on the operational phase of the system with specific emphasis on single-point failures. This process is not easily implemented for multiple system and multiple point failures.

Therefore, a need for a structured, standardized and efficient methodology for conducting a thorough analysis of a single product or a complex system to evaluate risk(s) to personnel and equipment, and identify mitigating factors to reduce the identified risk(s) has presented itself.

BRIEF DESCRIPTION OF THE INVENTION

Safety is achieved in the context of combining multiple protective technologies that address the reduction of risk. These include mechanical, human interaction, as well as electronic control means in reducing overall residual risk.

In accordance with an aspect of the application, a method for assessing the reliability requirements of safety instrumented control systems for safety to personnel is provided. The method comprises multiple steps and processing. These include: a) segmenting a product into subcomponents for hazard review; b) identifying at least one operating parameter of a first subcomponent of the product; c) identifying an inherent hazard of the first subcomponents based on an analysis of the at least one operating parameter; d) identifying features of the structure or operation of the subcomponent corresponding to the inherent hazard; e) identifying modifications or controls for the identified features that would mitigate the inherent hazard; f) prioritizing the identified features with respect to the effect that each of the features has on safety of the product; g) identifying current documentation that defines the structure or operation of the subcomponent; h) including in the current documentation, a safety audit procedure that identifies one or more of the prioritized features for inspection, and i) determining whether an unsafe condition could result from the inherent hazard after step (e); and wherein if an unsafe condition has been determined, further conducting a hazardous operation review comprising: j) identifying at least one contributing factor to the unsafe condition, where the factors are selected from a group comprising at least one of: a design deviation of the subcomponent, an operating mode of the subcomponent, and a mode of personal interaction with the subcomponent; k) generating a matrix correlating the identified features and the contributing factors, wherein the matrix identifies the at least one contributing factor corresponding to each of the identified features; l) creating a hazardous operation table that identifies for each of the identified features a cause of the corresponding contributing factor and the modifications and controls to mitigate the hazard; m) determining a risk of the hazard based on a severity level of the unsafe condition corresponding to the hazard and a likelihood of an occurrence of the hazard; n) if the risk exceeds a predetermined level, identifying further modifications or controls for the identified features that would mitigate the inherent hazard, and then repeating the determination of risk step until the risk is no greater than the predetermined value or no further modifications or controls are identifiable; and further comprising an accident scenario review, if after step (n) the severity exceeds the predetermined level, the accident scenario review (ASR) comprising: o) identify one or more of the inherent hazards contributing to the unsafe condition; p) generate a logical path of events, (for example in the form of nodes in the ASR model) leading from the identified inherent hazards to an accident occurring due to the unsafe condition, wherein the logical path is generated using the hazardous operations table; q) identify the nodes of the logical path that, if avoided, would prevent the accident; r) for each identified node, assign a likelihood level or a probability that the event will occur, if the node includes a safety instrumented control function, set the failure probability of the safety instrumented control function equal to 1, thereby disabling (eliminating the risk reduction) the safety instrumented control function; and s) if the likelihood level for proceeding through the scenario to the final unsafe condition exceeds a predetermined tolerable risk threshold, then identify modifications or additional safety instrumented control functions that would mitigate the inherent hazard; t) for each safety instrumented control function assess the risk reduction factor requirements necessary to achieve the predetermined tolerable risk by calculating the ratio between the tolerable risk threshold value and the likelihood value for the final unsafe condition (determined in (s)). This ratio represents the required risk reduction factor for the safety-instrumented function. Knowing the risk reduction factor defines the reliability requirements for the safety instrumented control function.

Another aspect of the application provides a method of evaluating a product for safety. The method comprises: a) determining if the product can be analyzed as a single component, and if true; b) identifying single-point failures likely to cause a hazard; c) reviewing product design features likely to cause the hazard; (d) identifying unsafe conditions contributing to the hazard; (e) assigning a severity level to each of the unsafe conditions of the hazard; (f) completing the method if the severity level of each of the unsafe conditions is no greater than a predetermined threshold severity level; (g) if one or more of the severity level of one or more of the unsafe conditions is greater than the threshold severity level, performing an accident-scenario review; and (h) identifying and issuing mitigating actions to prevent one or more of the unsafe conditions. Where, as part of step (h) if a safety instrumented control function is provided, its effectiveness is determined as an acceptable level of probability of failure on demand or maximum unsafe failure rate, to establish safety instrumented control function system requirements that enable a determined risk of a hazard to be within predetermined risk level values.

These and other aspects, advantages and salient features of the invention will become apparent from the following detailed description, which, when taken in conjunction with the annexed drawings, where like parts are designated by like reference characters throughout the drawings, disclose embodiments of the invention.

DETAILED DESCRIPTION OF THE INVENTION

Figure 1:
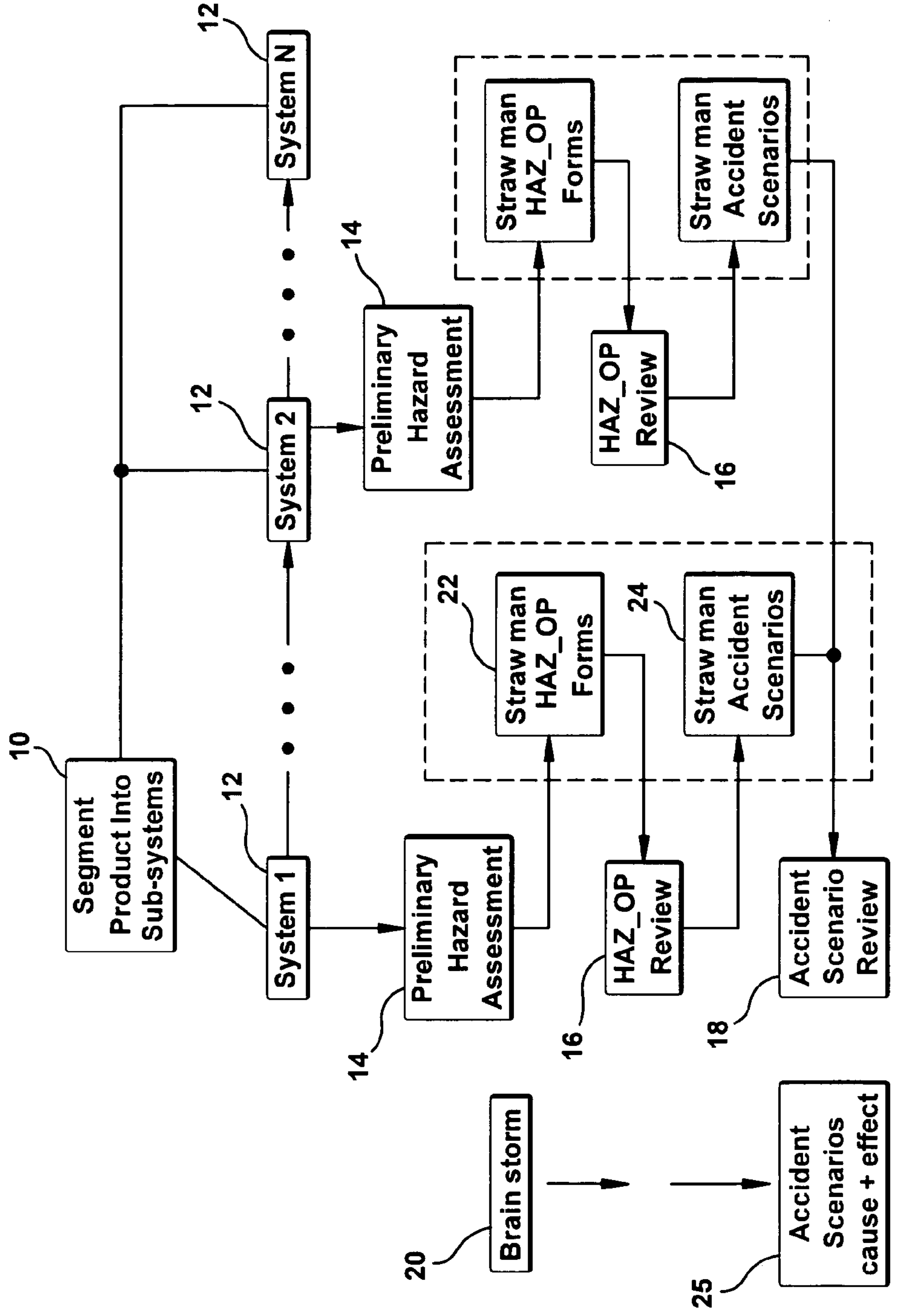
FIG. 1 is a high-level block diagram of a safety review process, as embodied by the invention.

FIG. 1 is a block diagram illustrating of a safety review process to evaluate hazards for a product, system or method (collectively referred to as the product), as embodied by the invention. In a first step 10, the product is segmented into sub-systems or sub-components, if necessary. Each sub-system or sub-component 12 is individually analyzed for safety using a three-step process that generally includes a preliminary hazard assessment 14, hazardous operations review 16 and an accident scenario review 18. The hazard assessment 12 and hazardous operations review 14 may be applied individually to each sub-system 12, and the accident scenario review 18 may be applied to the product as a whole.

The preliminary hazard assessment may be conducted as a "brainstorming session" 20 to identify the inherent hazards associated with the product and its operation. A determination is made as to whether any of the inherent hazards might become a safety-compromising hazard. If a credible safety-compromising hazard is identified, the process proceeds to a hazardous operation review. Using the results of the preliminary hazard assessment 14, a listing of hazardous operations may be generated and defined as a straw man "HazOp" form 22.

Accident scenarios 25 are considered to identify the cause and effect of identified hazards. The hazardous operations taken from table 22 are analyzed in the review process 16. Straw-man accident scenarios 24 are prepared based on the results of the hazardous operation review 16 if the hazardous operation review identifies a resulting unsafe condition of high severity. The straw-man table 22 and straw-man accident scenario 24 may be prepared by "facilitator(s)", who may be independent of the persons conducting the safety review for each sub-system and oversee the entire review process.

A safety review team, as embodied by the invention, may comprise the following persons:

Facilitator: A person(s) charged with ensuring that the safety review process steps are followed, the documentation is kept in a consistent manner, and ensuring that the meetings are focused on relevant subject matter.

Owner: A person(s) having technical ownership of a product. The owner has responsibility of providing technical understanding of the subject (product or process or system), and is authorized to implement direct change to the product or process if necessary. Additional owners from other sub-systems or components that interface with the present system may also be required. For example, interface owners may come from quality control, manufacturing, sourcing, transport, etc. and are deemed necessary to cover critical to safety topics.

Reviewers: People with experience in the field(s) associated with the subject. Reviewers are charged with having expertise in technical, legal, environmental, health and safety issues, to name a few. The members of the review team provide necessary checks and balances in reviewing the hazards associated with the subject. Reviewers also assure critical review of the controls and verifications that are in place to mitigate the hazards of a subject. Further, reviewers provide state-of-the-art knowledge capability to implement additional controls or verifications.

Figure 2:
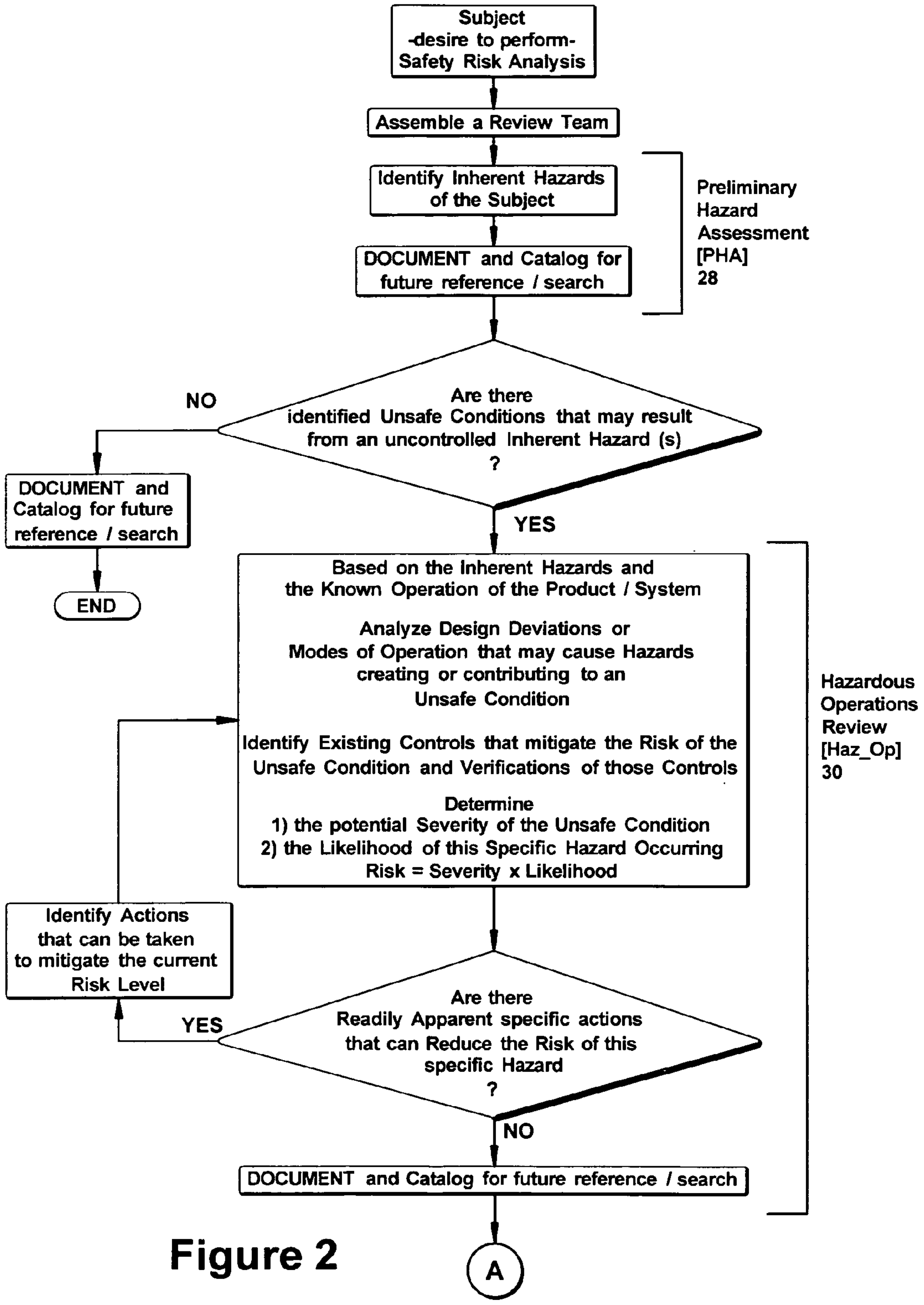
FIGS. 2 to 4 are flowcharts illustrating identify and mitigate hazards related to a product or system, as embodied by the invention.
Figure 3:
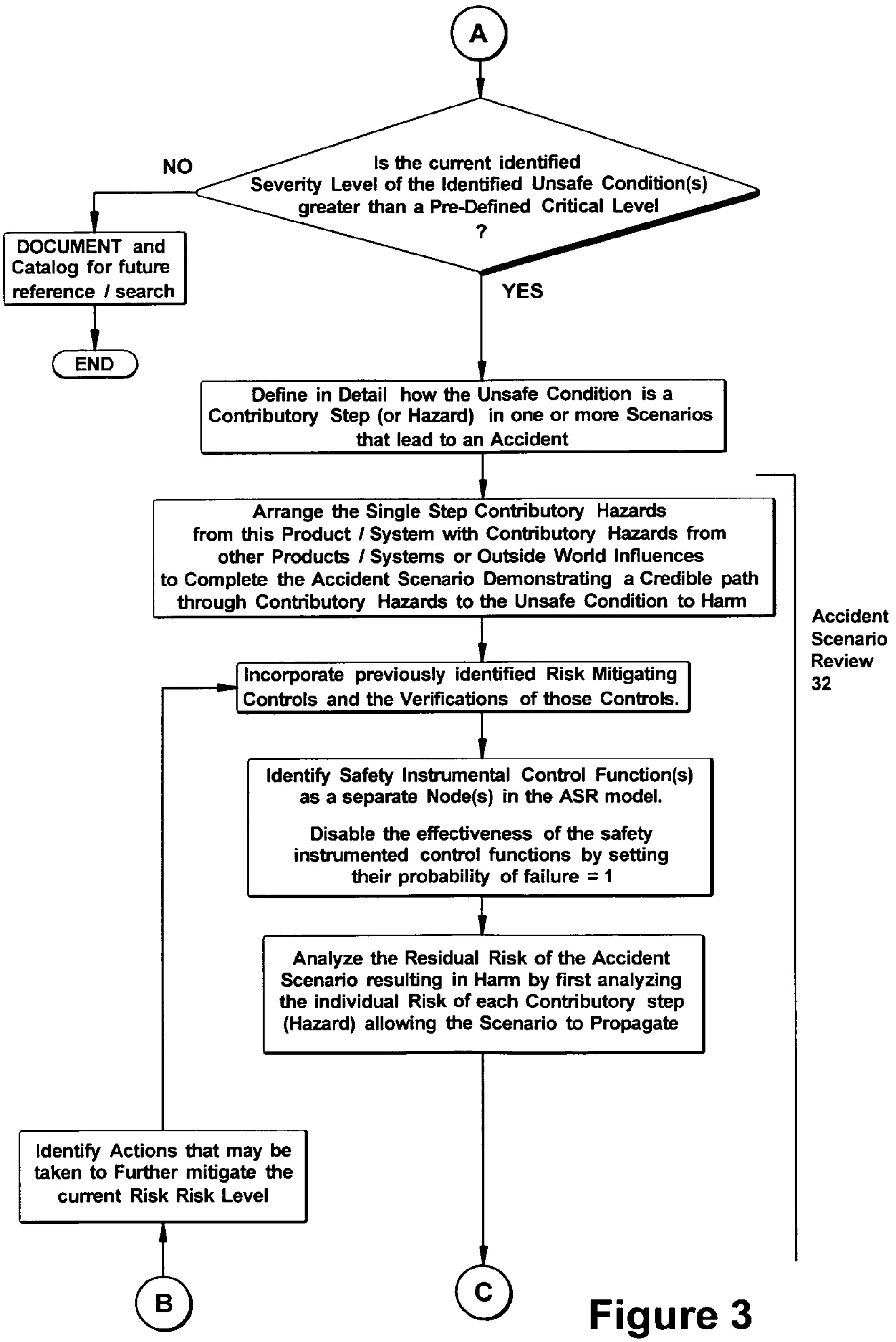
Figure 4:
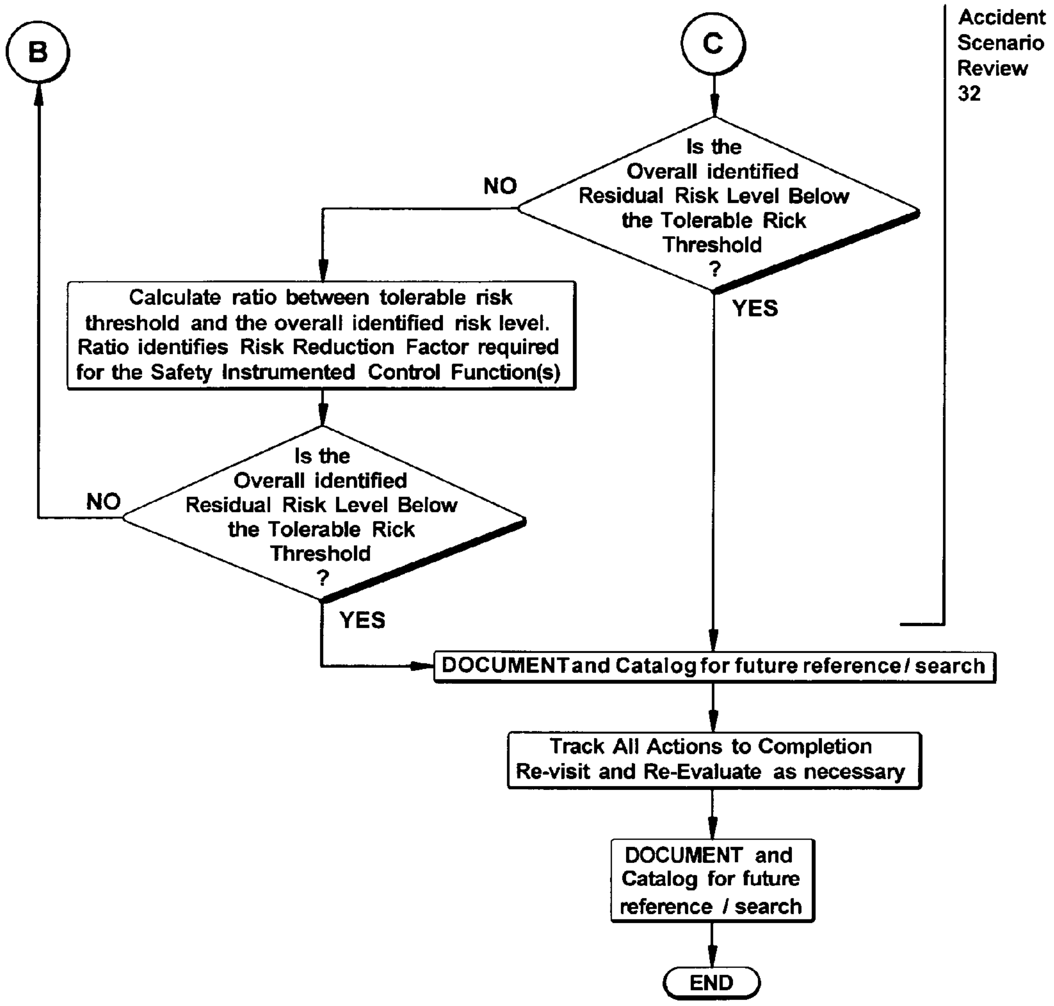

FIGS. 2 to 4 illustrate a high-level flow-chart 26 illustrating an overall hazard review and safety process comprising steps to identify inherent hazards of a product and determine if the measured risk level due to the identified hazards is within predetermined risk levels, as embodied by the invention. Once inherent hazards are identified, single-point failures based on each identified hazard are determined. If the determined risk level is within predetermined values, those values are documented. However, if the determined risk level is not within predetermined values, then mitigating factors to control the single-point failures are identified.

A determination is made to identify if a hazard is related to a high severity, unsafe condition. Such conditions may be the result of multi-point failures, e.g., when a hazard spans several sub-systems or components of a product. If a high severity, unsafe condition is identified, then a thorough analysis of the affected sub-systems or components of the product is performed and mitigating factors to prevent the high severity, unsafe condition are determined. A further determination is made to identify if the overall risk level of a product under review is acceptable or not. If the overall risk level is found to be acceptable, then such information is documented and the method ends. If not, the process is repeated until the overall risk level is found to be within acceptable limits.

At the completion of the hazardous operations review, a determination is made as to whether the current identified severity level of the identified unsafe condition(s) is greater than a pre-defined critical level 34. The predefined critical level is set by the facilitator, owners, reviewers, and/or by company standard. If the identified unsafe conditions are no greater than the critical level of severity, the overall hazard review and safety process is documented and completed. Some remaining level of risk cannot be easily avoided and exists in all safe products and safe systems, once this acceptable level of hazard risk is achieved, the overall process is completed and the product or system may be deemed safe. The overall process is terminated based on recognition that there is an acceptable level of hazard risk. However, if the unsafe condition has a high severity rating, then the hazard review and safety process continues to the accident scenario review sub-process 32.

The overall hazard review and safety process, as illustrated in FIGS. 2 to 4 is grouped into a preliminary hazard review sub-process 28, a hazardous operations review sub-process 30, and an accident scenario review sub-process 32. Each of these sub-processes is described in further below and in connection with the additional figures.

Figure 5:
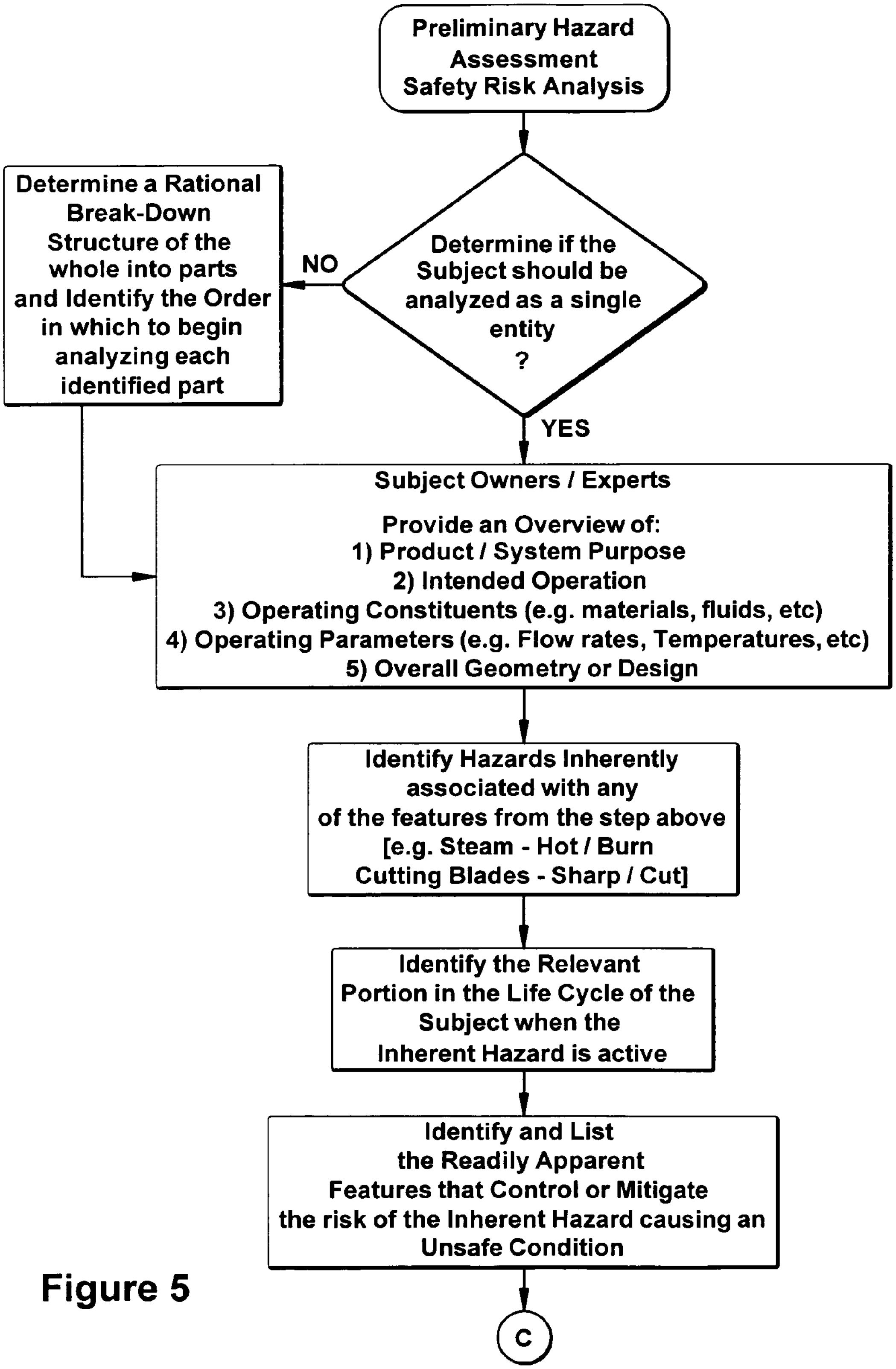
FIGS. 5 and 6 are flowcharts illustrating the process steps to identify preliminary hazards associated with a product or system, as embodied by the invention.
Figure 6:
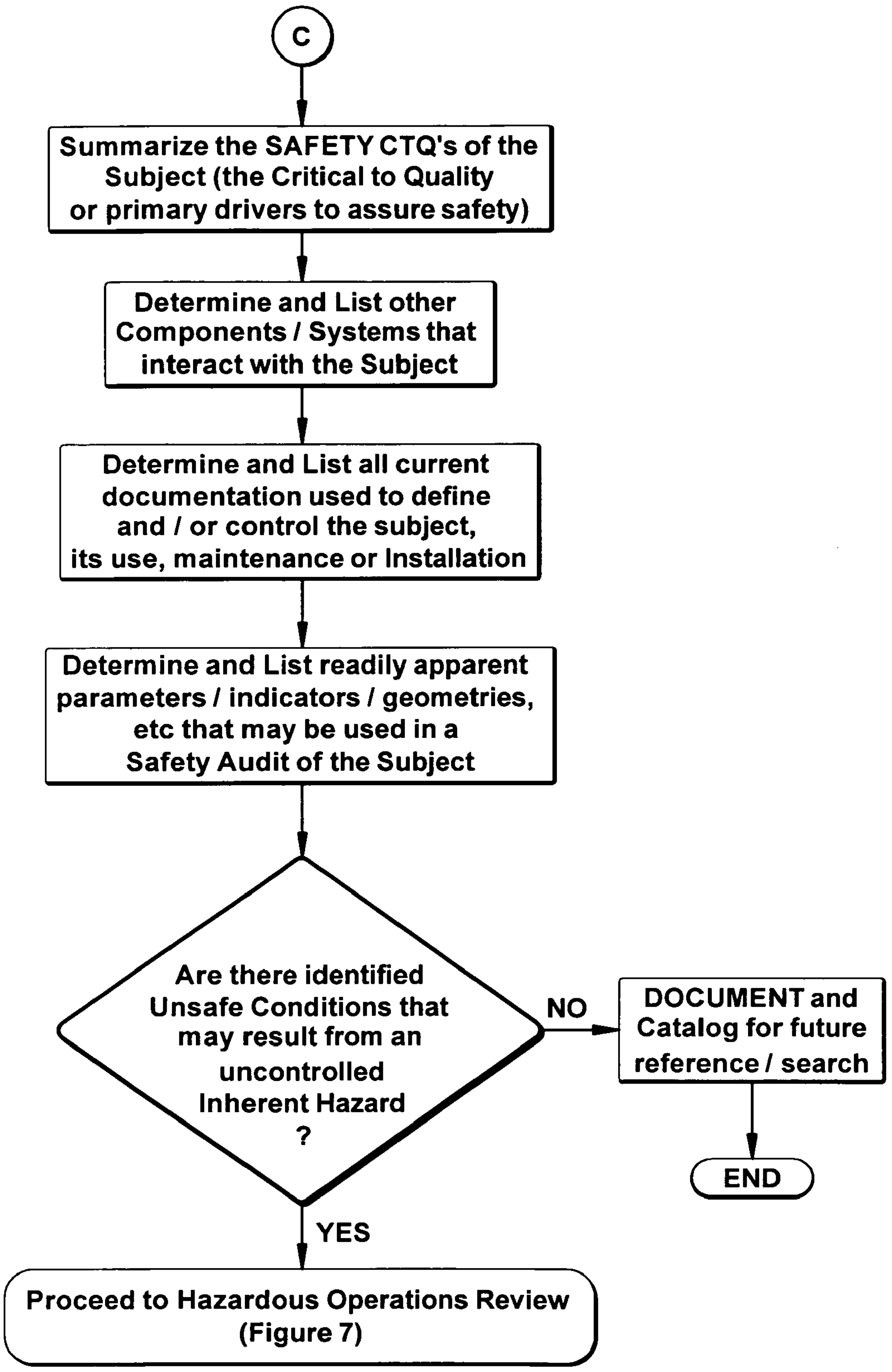

FIGS. 5 and 6 illustrate a detailed flowchart illustrating the process steps for the sub-process of the preliminary hazard assessment 28 that identifies inherent hazards associated with a product in accordance with an exemplary embodiment of the present invention. The preliminary step of this process 28 determines if a product may be analyzed as a unit, or whether the product should be analyzed in sub-systems or sub-components. During the preliminary hazard assessment, a structured "brainstorming" activity may be performed to highlight inherent hazards associated with the product. During this initial step, second objectives may also be collected. The second objectives assist in determining the features of the product that are already in place that mitigate risks and control inherent hazards. This step of obtaining secondary objectives may be accomplished by working through the format of a questionnaire, however other formats are well within the scope of the application. The description herein of a "questionnaire" is merely exemplary and is not intended to limit the application in any manner.

An exemplary questionnaire may ask owners to describe in detail the product, or its sub-system and components, using drawings, diagrams, tables, or other descriptors. This process may familiarize or re-familiarize the owners and the reviewers of the product. The owners of the product may then have to go through a pre-assembled list of generic inherent hazards tailored to the industry or the product field. During this familiarization step, the owners may work with a facilitator to identify generic inherent hazards related to the product.

The resulting tailored list allows the owners to focus only on relevant hazards. Typically, there may be three life cycle categories when the hazards may occur. Non-limiting examples of life cycle categories include installation, operation, maintenance for industrial equipment, and manufacture, use, and disposal for a consumer product. A determination is made to identify the relevant portion of the life cycle of the product or system, where the hazard may occur. The description of how the hazard occurs may be determined by any suitable manner, such as via a group discussion. Additionally, the cause of the hazard and current known features that are in place in order to control or mitigate the hazard may be listed.

During the preliminary hazard assessment step, the owners of a product may be asked to summarize the key safety assuring goals associated with the subject product or system. This step may result in a concise statement as to how identified risks need to be controlled or mitigated. For example, the primary safety critical factor of a pressure vessel is to retain structural integrity over time. This desirable feature may be ensured through attention to creep failure margins of the vessel during the design process. Following the step of identifying the key safety control and mitigation features, the owners may be asked to list other components, sub-systems that interact with the subject product in order to determine if the other sub-systems are affected by the hazards identified with respect to the current sub-system. A list is also created identifying the current documentation which includes, for example, design practices, industry codes and standards, instruction manuals, and other documentation that are currently used to control the subject product or system.

The owners may be asked to list key items that can be verified as a final check in order to ensure that safety features are established and in place. These are typically known as operational readiness review (ORR) items. Examples of ORR items may include a pop-up button on the sealed food container, a red tag on a safety critical aerospace feature, or a correctly run vent line on an industrial fuel system.

Figure 7:
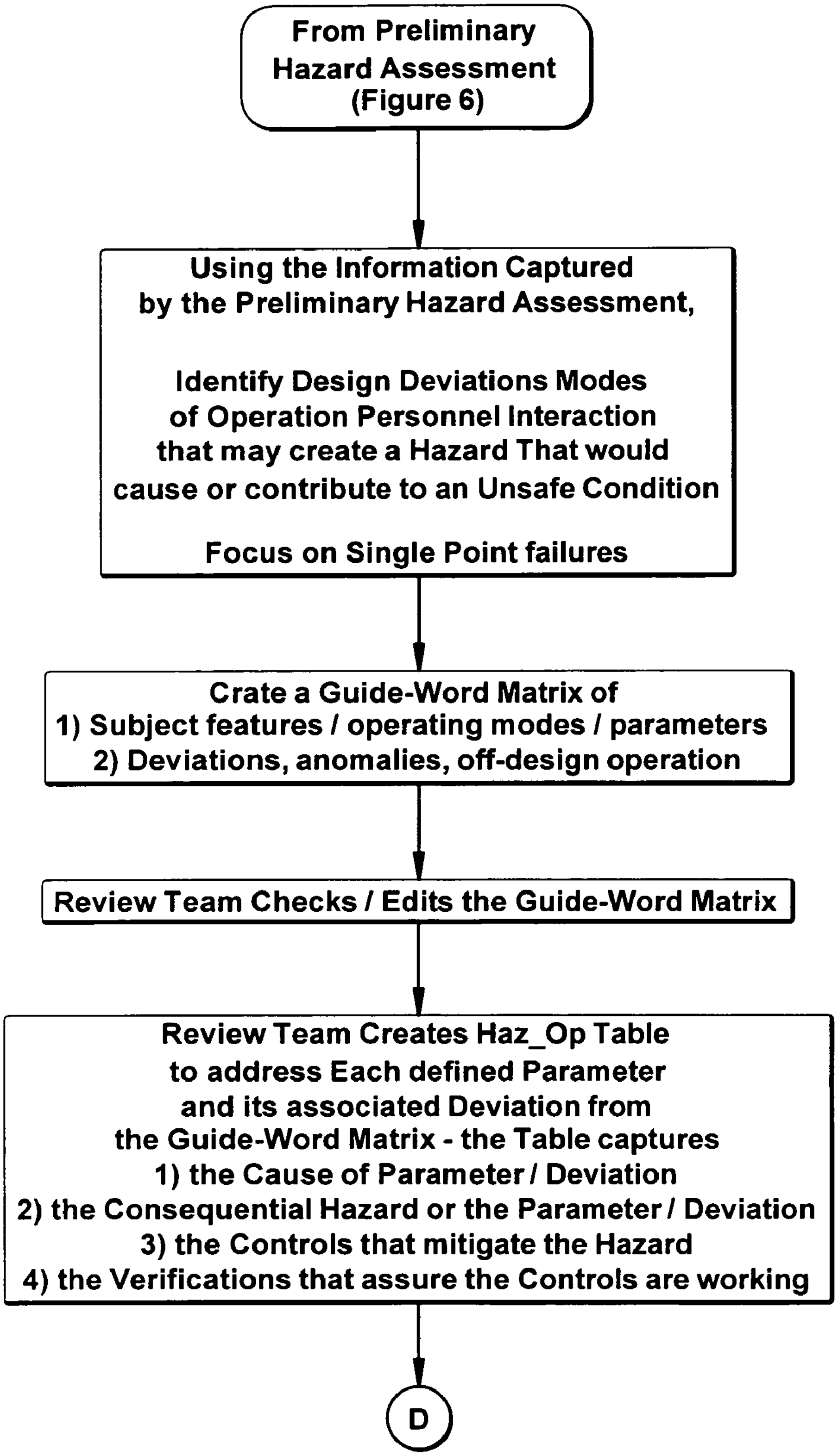
FIGS. 7 to 9 are flowcharts illustrating the process steps to perform hazard operations review further to identifying preliminary hazards associated with a product/system, as embodied by the invention.
Figure 8:
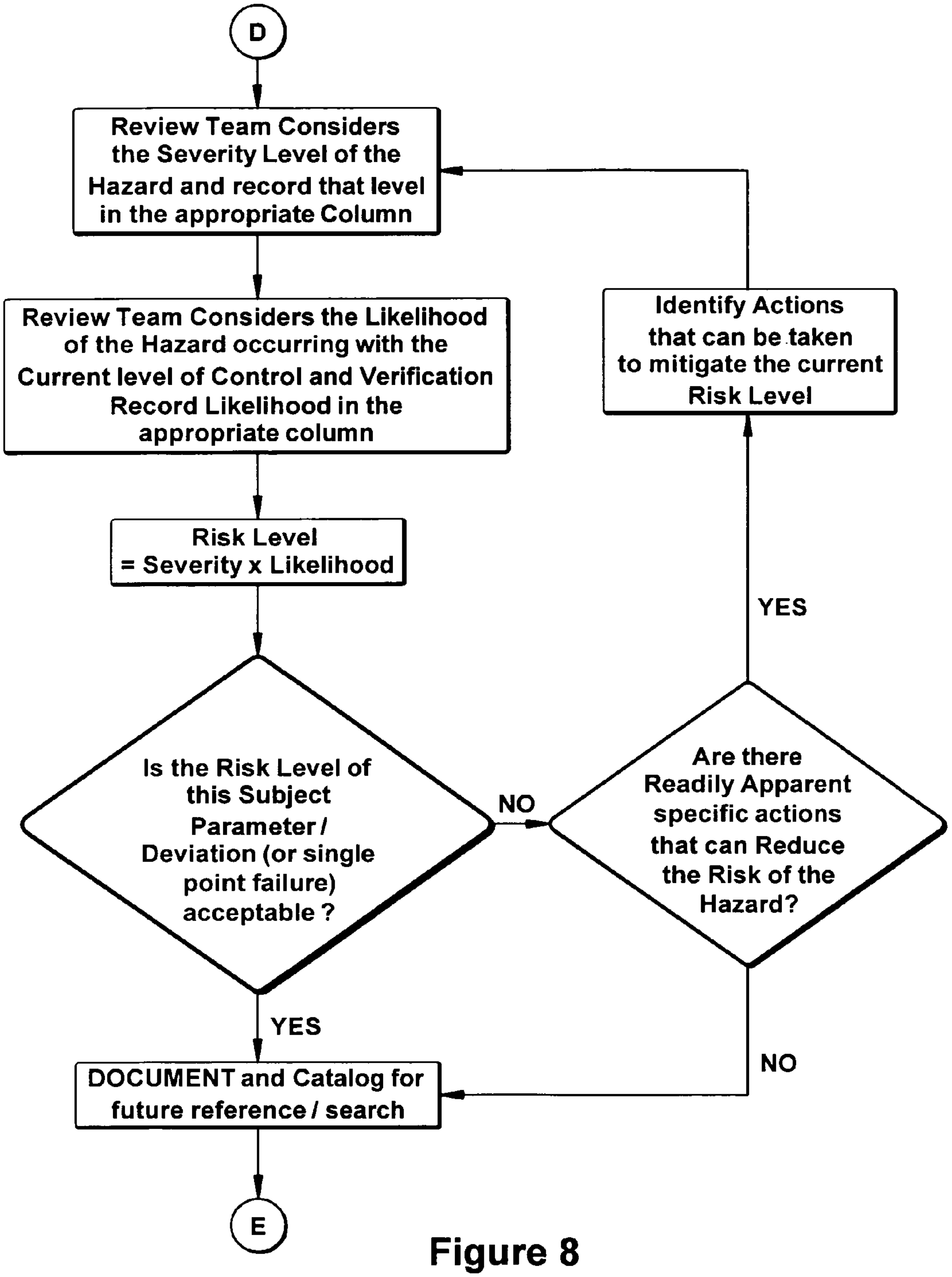
Figure 9:
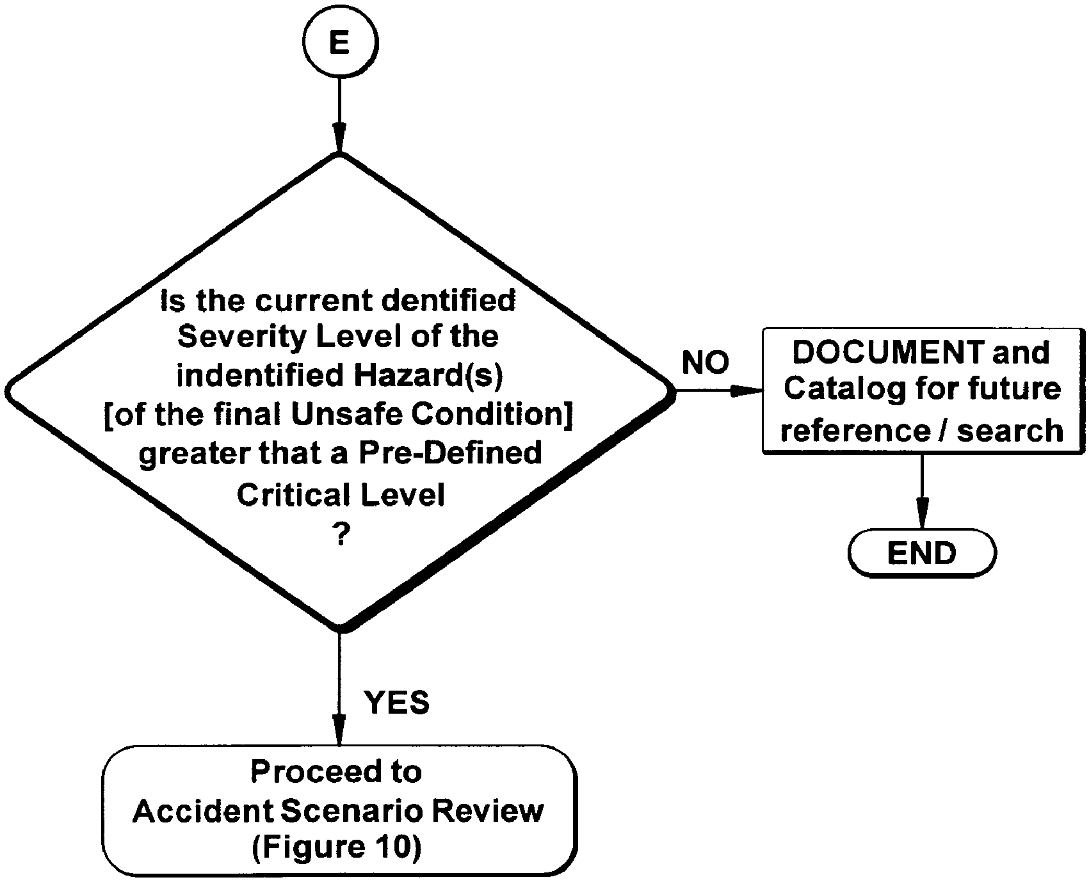
Figure 10:
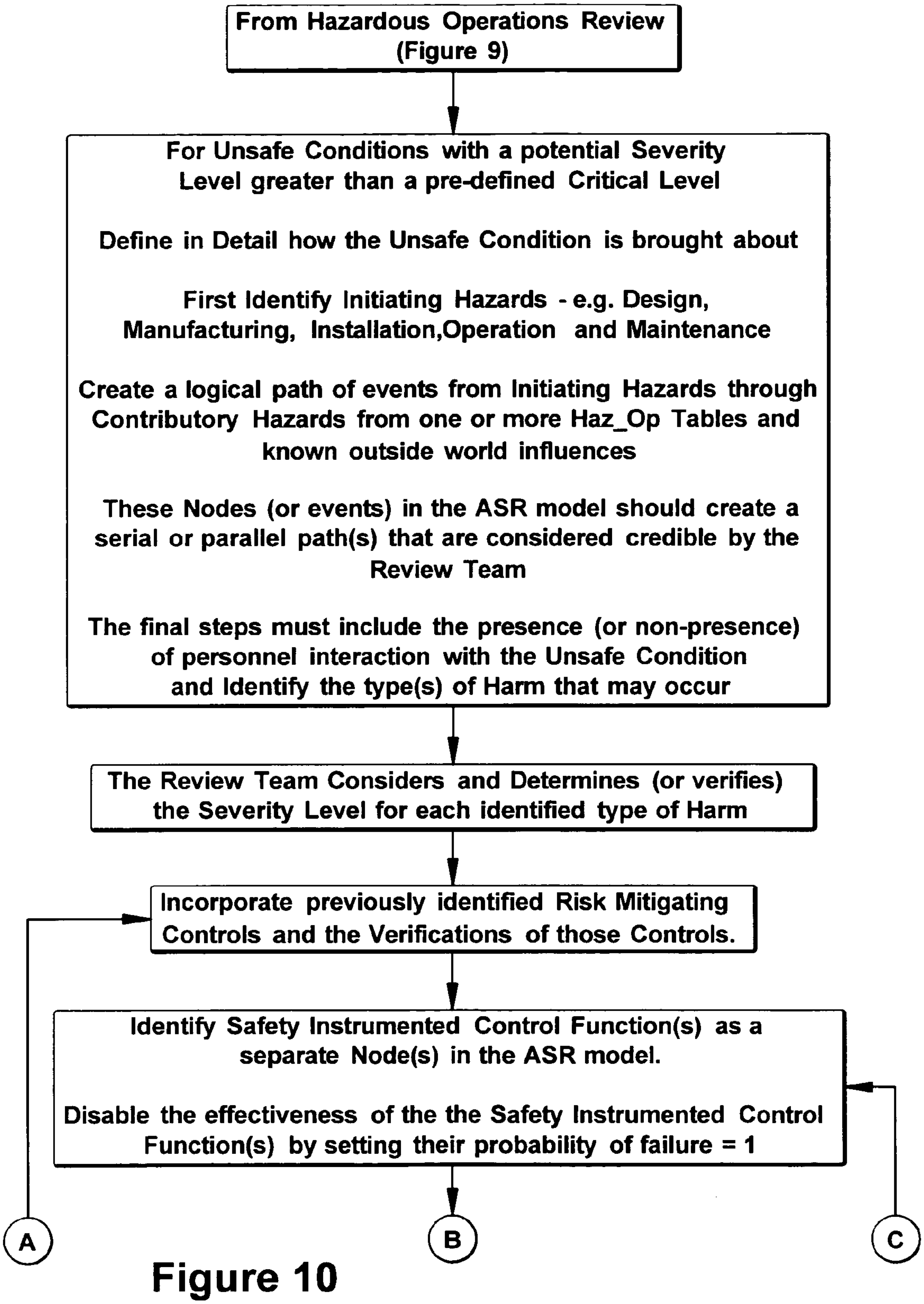
FIGS. 10 to 13 are flowcharts illustrating the process steps identifying multi-point failures, determining if the overall risk is acceptable, and assessing the probability of failure requirements for a safety instrumented control function as embodied by the invention.
Figure 11:
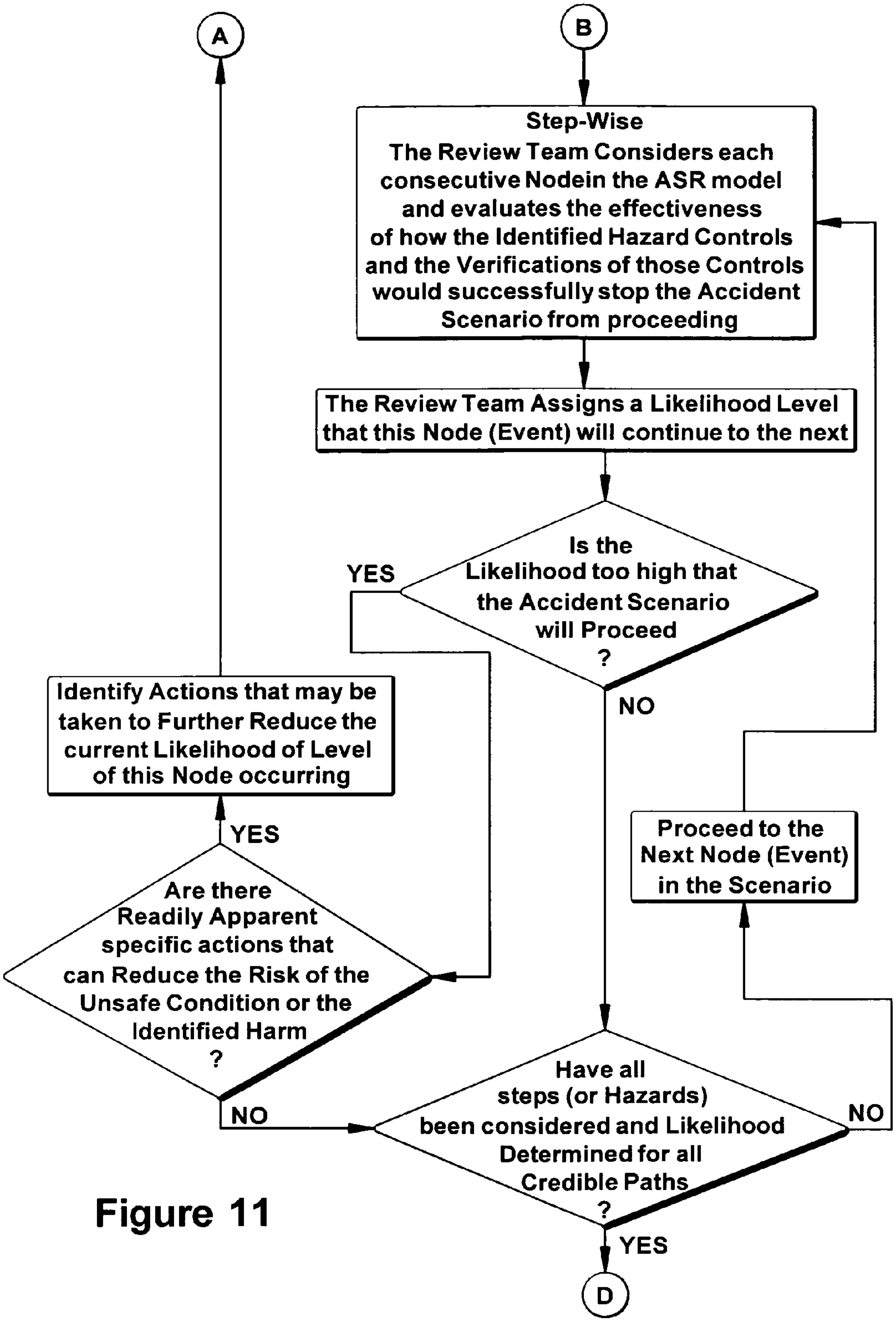
Figure 12:
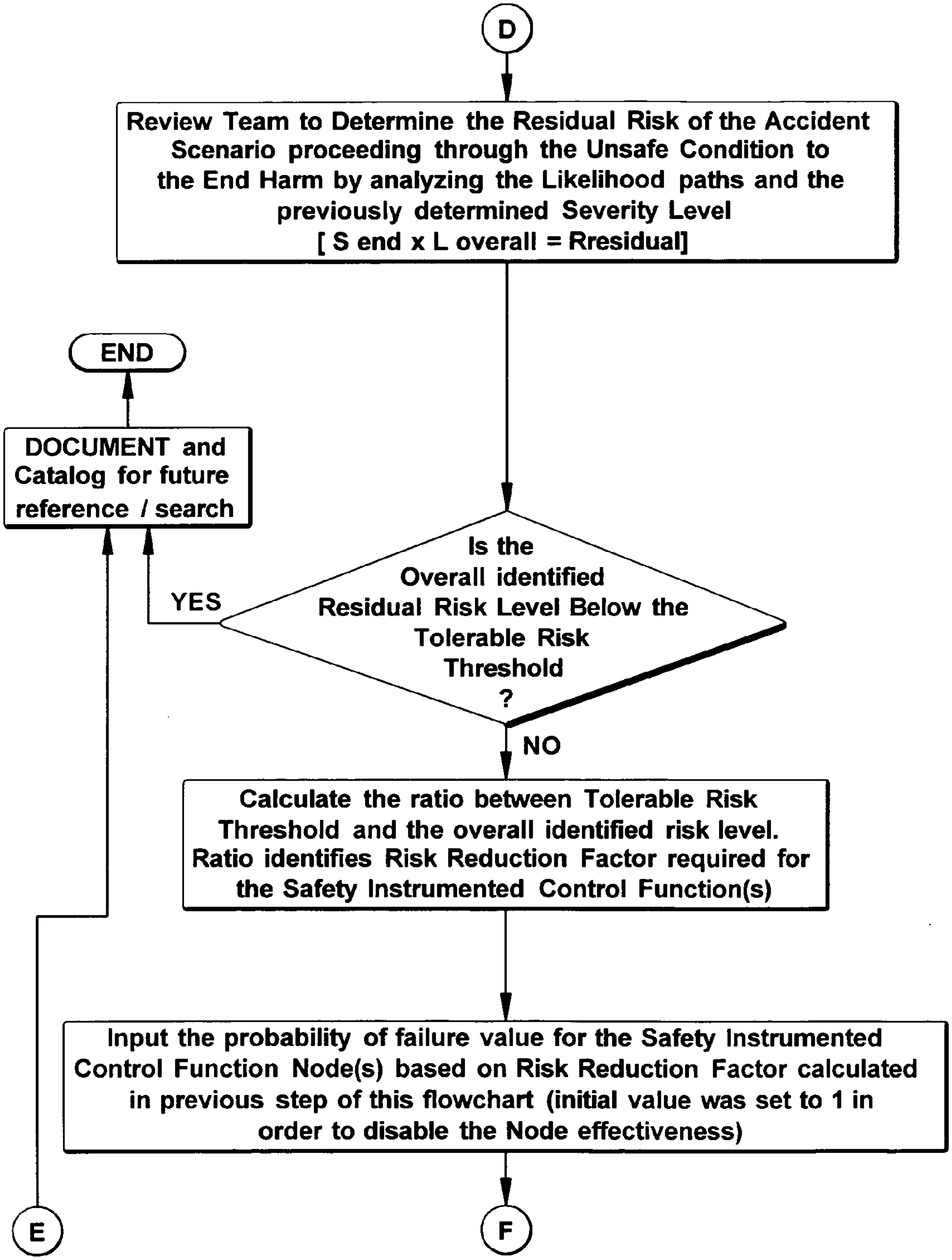
Figure 13:
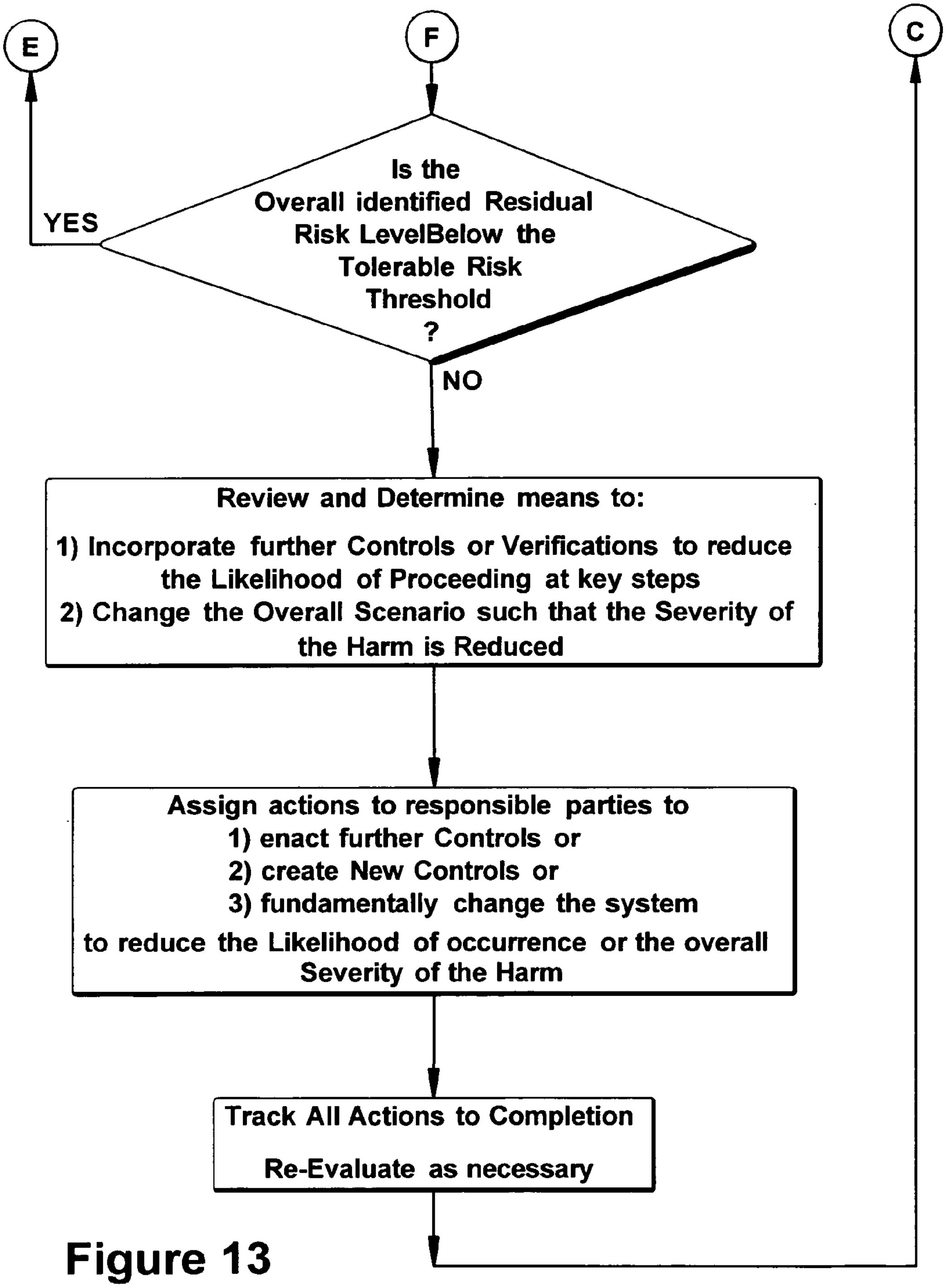

FIGS. 7 to 9 illustrate a flowchart illustrating the process steps to perform the sub-process of hazard operations review 30 that further identifies safety comprising hazards associated with a product. The second set of the safety review process methodology performs hazardous operations review drawing initial information from the preliminary hazard assessment. During this step, parameters and deviations based upon the basic operating parameters of a product or system are identified in order to determine off design or single-point failure mechanisms that might result in safety issues.

The facilitator may assemble information necessary to create an intermediate or straw man hazardous operations table from a preliminary hazardous assessment document. During this step, various product parameters and deviations from these parameters that may compromise the safety of the product or system are identified. In the event that the severity level of the associated unsafe condition is above a critical level, the safety review process methodology of the present system is expected to perform a third additional step and conduct the accident scenario review in their review as illustrated in FIGS. 10 to 13.

The basic operating parameters of a specific product usually make up the primary parameters responsible for potential hazards. Subsequently, for each parameter, a deviation or a set of deviation words are chosen for some off design or unintended situations.

The basic operating parameters and their deviations are usually based on a single-point failure mechanism that a review team is expected to consider. The straw man hazardous operations table is completed ahead of the hazardous operations review process to the extent possible with information from the owner of the product in addition to the preliminary hazard assessment. The step of creating a straw man hazardous operations table may increase the efficiency of a review team meeting. A formal review is then executed with a review team working stepwise through the straw-man table confirming or altering the figures identifying parameter, deviation, cause, consequence (e.g. the unsafe condition), controls, and verifications relating to a hazard.

The review team, upon reviewing each raw entry in the hazardous operations table, rates the severity of the potential unsafe condition that may occur. The review team then determines the likelihood of the consequence occurring given the current controls and verifications that are in place. In order to maintain consistency with other review processes, the safety review process of the present invention involves "severity" and "likelihood" ratings related to an existing standard.

After obtaining a ranking score or risk level for each single-point failure, the review team then determines if the current safety ranking of each single-point failure is adequate or whether further control or mitigation steps are required. If it is determined that further control or mitigation steps are deemed necessary, the required steps are recorded and an action item assigned to a person to mitigate the potential risks. After the action item is assigned and executed, the safety review team determines if a reduction in severity or likelihood of hazard occurrence has occurred. This information is recorded and stored.

During the hazardous operations review process, if an unsafe condition is determined to have a severity level above the predefined critical level, then an accident scenario review (ASR) step is required to adequately assure the safety of the overall product or system. This additional step is often required when considering multiple layers of protection including direct human. In determining whether to proceed with this additional ASR step, the safety review team may be required to decide whether the severity is high enough to warrant further effort to reduce hazards. The severity rating of the unsafe condition may be recorded first before the accident scenario review is assembled.

FIGS. 10 to 13 illustrate a detailed flowchart illustrating the process steps for the sub-process accident scenario review (ASR) 32 that identifies high severity failures that may involve multiple single point failures, and determines if the overall risk is acceptable. The ASR step provides a detailed final analysis in order to allow an understanding of the progression that lead to a high severity unsafe condition, and an understanding of the inter-related safety critical features that are in place in order to stop the progression of the scenarios leading to the unsafe condition.

The contributory hazard events are identified that may lead to the unsafe condition. These events are most often a series of single-point failures identified during the hazardous operation review. Additional human factors, such as, confusion over switches or lack of training, may be taken into account in determining contributory hazard events.

During each step of this ASR process, the controls and verifications may be identical to the control and verification steps identified in the hazardous operations review step. At each ASR step, the review team determines the likelihood or probability of each node (i.e. event) of the ASR model. The review team identifies the failure of safety instrumented control functions as a separate node in the ASR model to enable assessment of the risk of an event assuming the safety-instrumented control is function is disabled. The likelihood of failure is modeled with a probability equal to 1. This probability allows the team to assess the required risk reduction level necessary for the instrumented safety instrumented control functions. The next step is to determine the risk reduction factor requirements necessary to achieve the predetermined tolerable risk threshold by calculating the ratio between the tolerable risk threshold value and the likelihood value for the final unsafe condition when the safety instrumented control node has been disabled. This ratio represents the required risk reduction factor for the safety-instrumented function that is necessary to ensure the acceptable residual risk threshold is met.

As a final consensus, the safety review team determines at the end of ASR process, whether the scenario as a whole is adequately controlled and acceptable. If the overall risk level is unacceptably high, and cannot be mitigated by a safety instrumented control function, then actions are considered to increase controls or verifications that may reduce the risk level. If the risk level is unacceptable and further controls or verifications do not reduce the risk, the redesigning of the product may be considered. If the overall risk level is acceptable, information obtained in the ASR process is documented and stored. This information may be used as a template in the event of future changes to a product, or when similar products are created.

Figure 14:
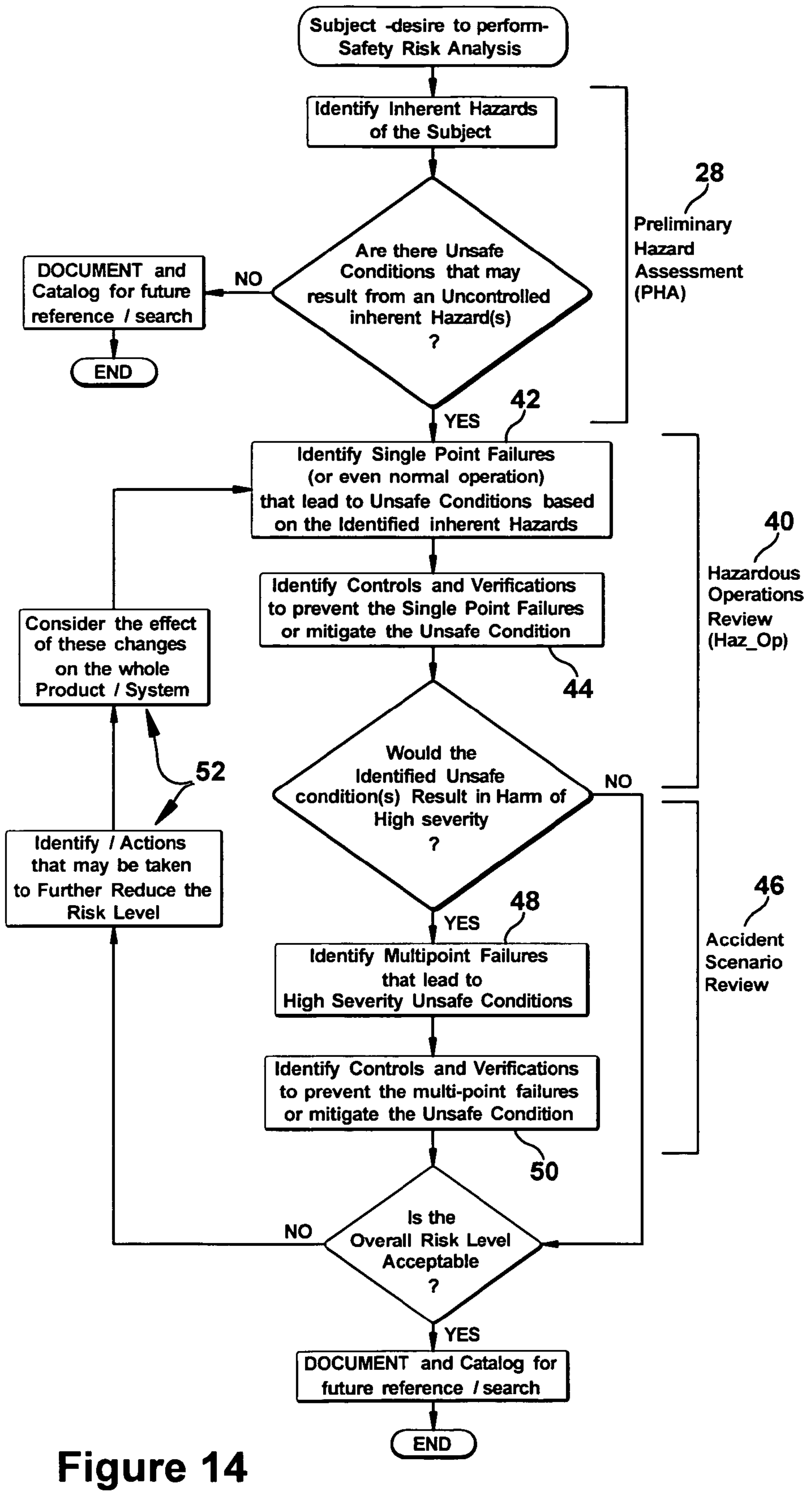
FIG. 14 is a flowchart illustrating a process, in which single and multi-point failures are evaluated, as embodied by the invention.

FIG. 14 is a flowchart illustrating the process in which single and multipoint failures are evaluated. After conducting a preliminary hazard assessment 28, a hazardous operations review 40 is conducted that includes step 42 for identifying single failures of the product, and determining whether each single point failure will result in one of the identified inherent hazards. For each single point failure, that may cause a hazard, features of the product, e.g., product components or operational steps of the product, are identified that could be modified to prevent or mitigate the single point failure, in step 44.

During the accident scenario review, step 46, the process identifies and evaluates multipoint failures of the product, at step 48, that may lead to an unsafe condition. A multipoint failure is, for example, a condition where two or more structural parts of a product fail or whether two or more standard operating procedures for the product do not occur or are preformed improperly, or some combination of failures of parts and procedures. Potential multipoint failures may be identified by considering the likelihood that two or more of the identified potential single point failures could occur together and result in an unsafe condition, that would not have resulted due to any one of the single point failures alone.

For the multipoint failures that result in a new unsafe condition (which are identified in step 48), an identification, step 50, is made of the features of the products, e.g., parts and operations, which may be modified to prevent or mitigate the unsafe condition resulting from the multipoint failure. If the overall risk of the product is not acceptable after step 50, then additional features are identified and considered, step 52, to reduce the risk level of the product. With these newly identified features, the hazardous operation review 40 process is repeated.

Figure 15:
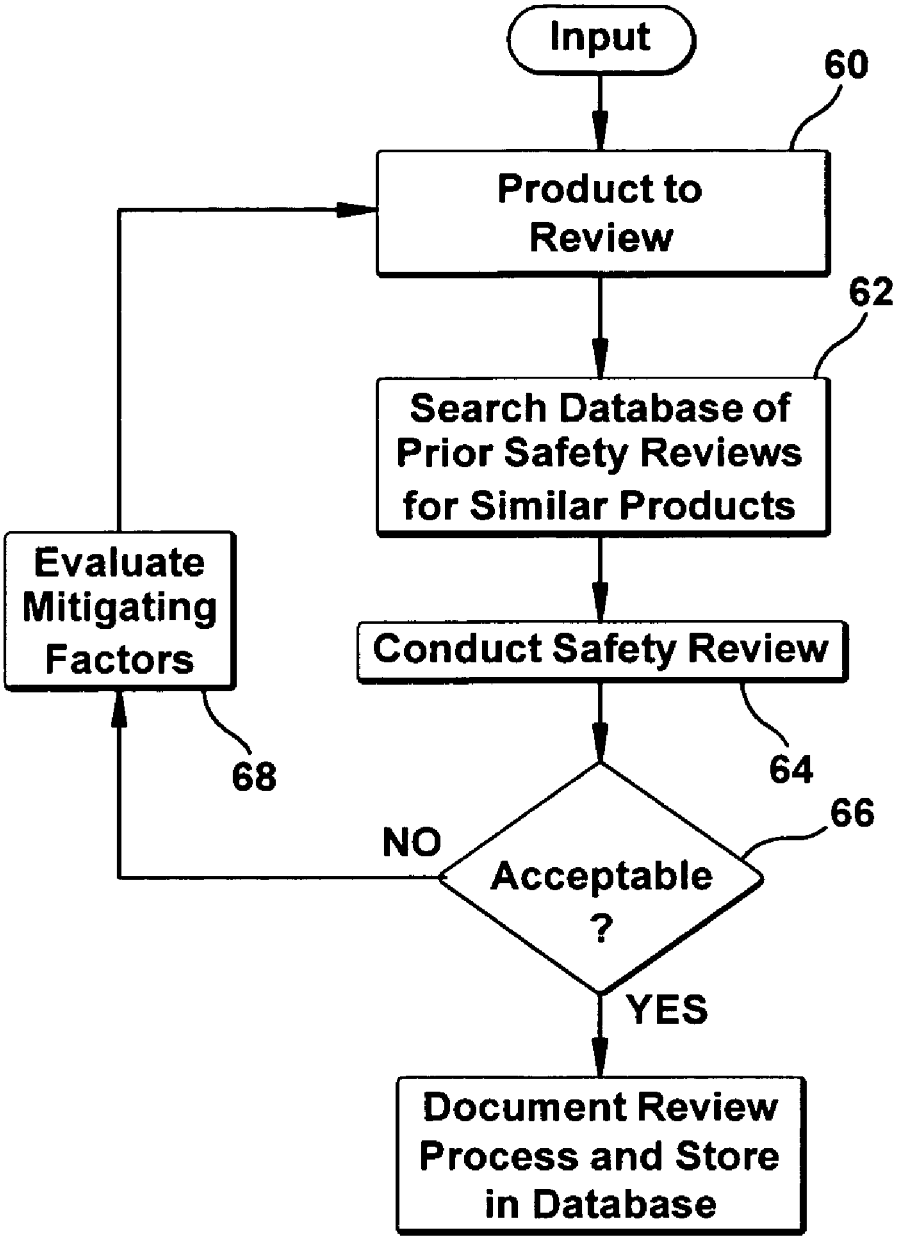
FIG. 15 illustrates a system and process to store in a database the results of a safety review, as embodied by the invention.

FIG. 15 illustrates an exemplary system schematic to perform the method steps described above and save the results of the safety review. The product 60 readied for the safety review and a search is performed in a computer database of documentation regarding prior safety reviews, step 62. If a previous safety review conducted on a similar product is in the database, then the documentation of the safety review is obtained and review in preparation for the safety review of the new product 60. Prior safety reviews provide information on hazards, unsafe conditions, failure points and mitigating factors of similar products. This information may be helpful in performing a safety review of a new product.

With the documentation from prior review, a new safety review 64 is performed in accordance with the procedures illustrated in the preceding figures. If at the conclusion of the safety review, the safety of the product is deemed acceptable, step 66, then the documentation of the safety review process is stored in the computer database for future use. But if the product is not sufficiently safe, then additional mitigating factors are evaluated, step 68 and the product review are repeated.

A structured framework to evaluate hazards is described herein with standardized documentation to create a universal, efficient, comprehensive approach in analyzing a product to assure necessary safety requirements. Also provided is a clearly structured, simple format for the safety review that ensures a rigorous treatment of the product. It ensures efficiency, by focusing the available limited time and resources on the most severe safety hazards. The present method also uses standardized tables for documentation to enhance clarity and thereby provide a basis for future product enhancements. It also defines sources of safety hazards inherent to a product or a system. Further, total risks are defined by the severity (or magnitude) of personnel injury or equipment damage that could occur and the likelihood of occurrence.

A structured methodology for assessing the probability of failure requirements for a safety instrumented control function by calculating the risk reduction factor using the ASR model to compare the tolerable safety risk threshold level to the residual safety risk level, (when the safety instrumented control function node is disabled).

In addition to the above, means to determine whether the current risk level is acceptable is provided by identifying key features that assure acceptability. Also identified are those items that need to be better controlled to ensure an acceptable risk level. These items are identified by performing highly detailed risk analysis into specific unsafe conditions that, due to their high severity, require better control to ensure an acceptable risk level.

The present safety review process also provides for documenting a company's diligent efforts to understand and control safety risks associated with the company product, thus providing a clear record for ensuring that safety is designed and built into future products.

The safety review process methodology of the present invention may be applied to any industry, product or process. The safety review process methodology of the present invention may be best administered by a focused group of facilitators in order to ensure commonality of documentation and standardization of record keeping. This method provides the ability to quickly search and identify previous similar templates when considering a new product, thus ensuring a consistent flow of the process over time and across product lines. A categorized database may be created to store the complete records of the hazard review process. This assists in performing such searches.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the stated value and has the meaning dictated by the context, (e.g., includes the degree of error associated with measurement of the particular quantity). The suffix "(s)" as used herein is intended to include both the singular and the plural of the term that it modifies, thereby including one or more of that term (e.g., the metal(s) includes one or more metals). Ranges disclosed herein are inclusive and independently combinable (e.g., ranges of "up to about 25 wt %, or, more specifically, about 5 wt % to about 20 wt %", is inclusive of the endpoints and all intermediate values of the ranges of "about 5 wt % to about 25 wt %," etc).

While various embodiments are described herein, it will be appreciated from the specification that various combinations of elements, variations or improvements therein may be made by those skilled in the art, and are within the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for analyzing a system for safety to personnel, said method comprising: a) segmenting a product into subcomponents for hazard review; b) identifying at least one operating parameter of a first subcomponent of said product; c) identifying an inherent hazard of said first subcomponents based on an analysis of the at least one operating parameter; d) identifying features of a structure or operation of the subcomponent corresponding to the inherent hazard; e) identifying modifications or controls for the identified features which would mitigate the inherent hazard; f) prioritizing the identified features with respect to an effect that each of said features has on safety of the product; g) identifying current documentation that defines the structure or operation of the subcomponent; h) including in the current documentation, a safety audit procedure that identifies one or more of said prioritized features for inspection, and i) determining whether an unsafe condition could result from the inherent hazard after step (e); and wherein an unsafe condition has been determined, further conducting a hazardous operation review comprising: j) identifying at least one contributing factor to the unsafe condition, where said factors are selected from a group comprising at least one of: a design deviation of the subcomponent, an operating mode of the subcomponent, and a mode of personal interaction with the subcomponent; k) generating a matrix correlating the identified features and the contributing factors, wherein the matrix identifies the at least one contributing factor corresponding to each of the identified features; l) creating a hazardous operation table that identifies for each of said identified features a cause of the corresponding contributing factor and the modifications and controls to mitigate the hazard; m) determining a risk of the hazard based on a severity level of the unsafe condition corresponding to the hazard and a likelihood of an occurrence of the hazard; n) if the risk exceeds a predetermined level, identifying further modifications or controls for the identified features which would mitigate the inherent hazard, and then repeating the determination of risk step until the risk is no greater than the predetermined value or no further modifications or controls are identifiable; and further comprising an accident scenario review (ASR), if after step (n) the severity exceeds the predetermined level, said accident scenario review comprising: o) identify one or more of the inherent hazards contributing to the unsafe condition; p) generate a logical path of nodes in the ASR leading from the identified inherent hazards to an accident occurring due to the unsafe condition, wherein the logical path is generated using the hazardous operations table; q) identify the nodes of the logical path that, if avoided, would prevent the accident; r) for each identified node, assign a likelihood level of a probability that the event will occur, if the node includes a safety instrumented control function, set the failure probability of the safety instrumented control function equal to 1, thereby disabling a risk reduction for the safety instrumented control function; and s) if the likelihood level for proceeding through the scenario to a final unsafe condition exceeds a predetermined tolerable risk threshold, then identifying at least one of modifications or additional safety instrumented control functions that would mitigate the inherent hazard; t) for each safety instrumented control function assess the risk reduction factor requirements to achieve the predetermined tolerable risk by calculating a ratio between a tolerable risk threshold value and said level for proceeding through the scenario to the final unsafe condition, wherein the ratio represents a required risk reduction factor for the safety instrumented function, thereby defining a probability of failure requirements for the safety instrumented control function.

2. A method according to claim 1, wherein the disabling comprises eliminating a risk reduction.

3. A method of evaluating a product for safety, said method comprising: a) determining if the product can be analyzed as a single component, and if true; b) identifying single-point failures likely to cause a hazard; c) reviewing product design features likely to cause the hazard; (d) identifying unsafe conditions contributing to the hazard; (e) assigning a severity level to each of the unsafe conditions of the hazard; (f) completing the method if the severity level of each of the unsafe conditions is no greater than a predetermined threshold severity level; (g) if one or more of the severity level of one or more of the unsafe conditions is greater than the threshold severity level, performing an accident-scenario review; and (h) identifying and issuing mitigating actions to prevent one or more of the unsafe conditions;

wherein as part of step (h) if a safety instrumented control function is provided, its effectiveness is determined as an acceptable level of probability of failure on demand, to establish safety instrumented control function system requirements that enable a determined risk of a hazard to be within predetermined risk level values.

4. A method according to claim 3, wherein the product comprises a sub-system.

5. A method according to claim 4, further comprising:

determining overall risk level of the product; comparing the overall risk level with predetermined risk level value; and storing risk related data if the overall risk level is within predetermined risk level value.

* * * * *